July 29, 1924.
E. H. SIPPEL ET AL
1,503,254
ARMATURE WINDING MACHINE
Filed Aug. 14, 1920
4 Sheets-Sheet 1
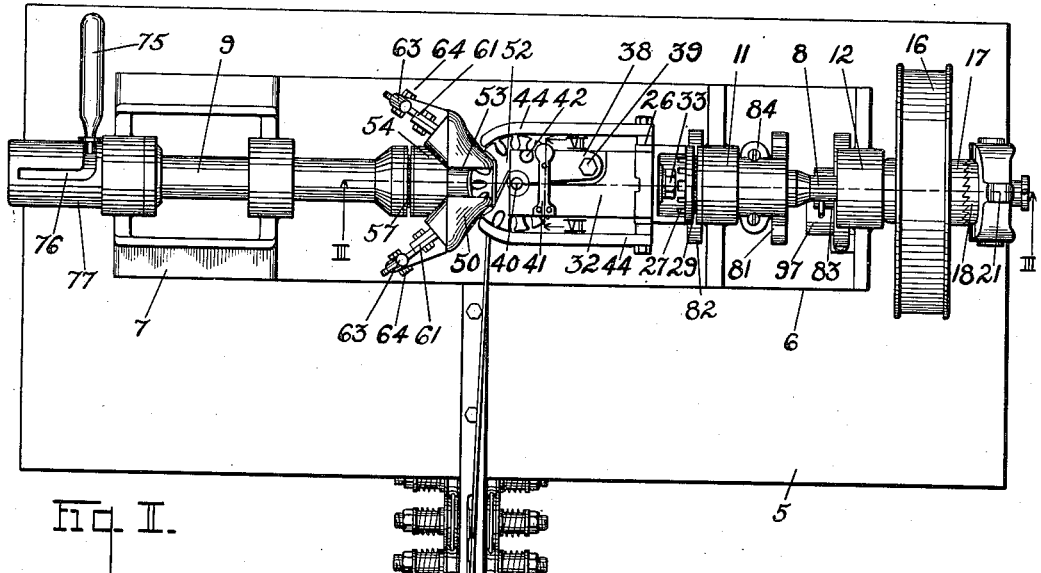
Fig. II.
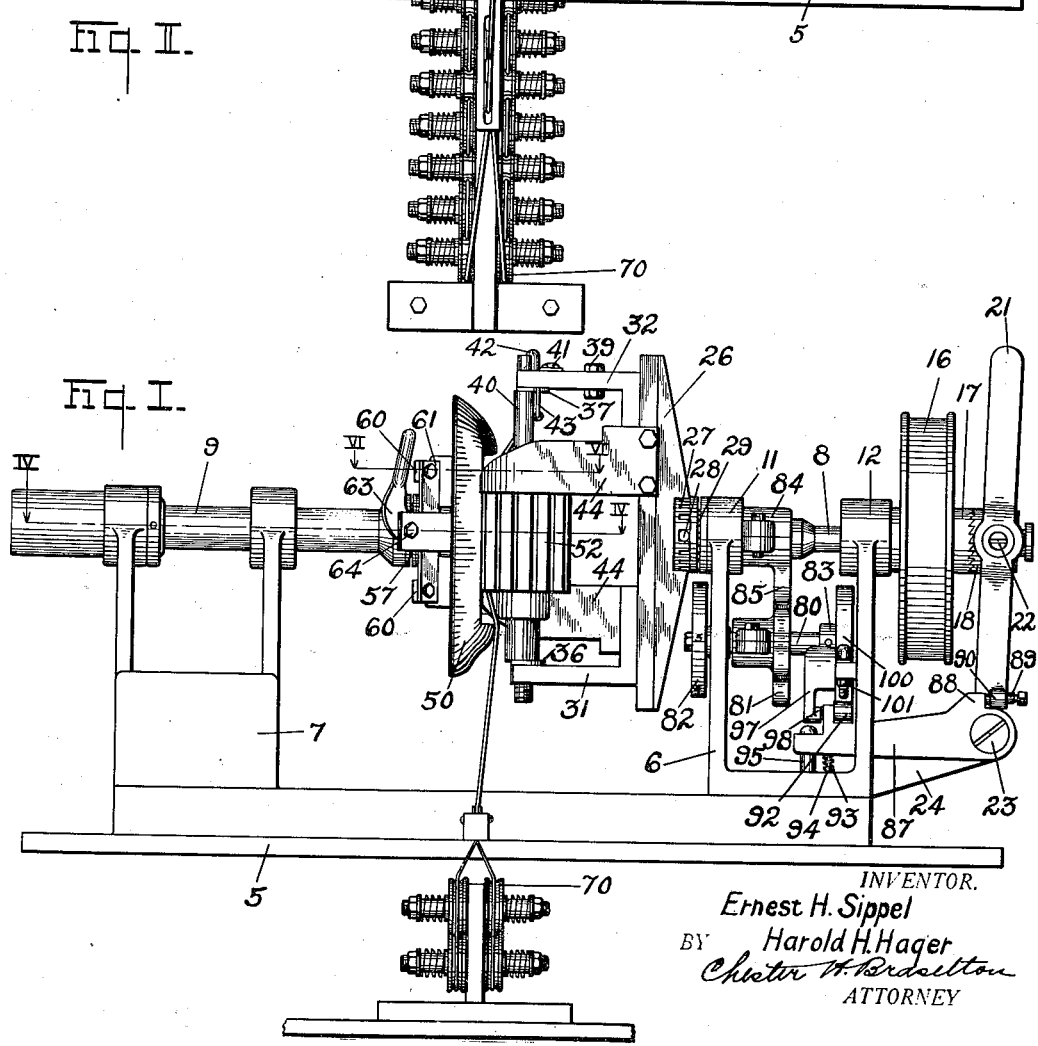
Fig. I.
INVENTOR.
Ernest H. Sippel
Harold H. Hager
BY Chester W. Birdseltou
ATTORNEY

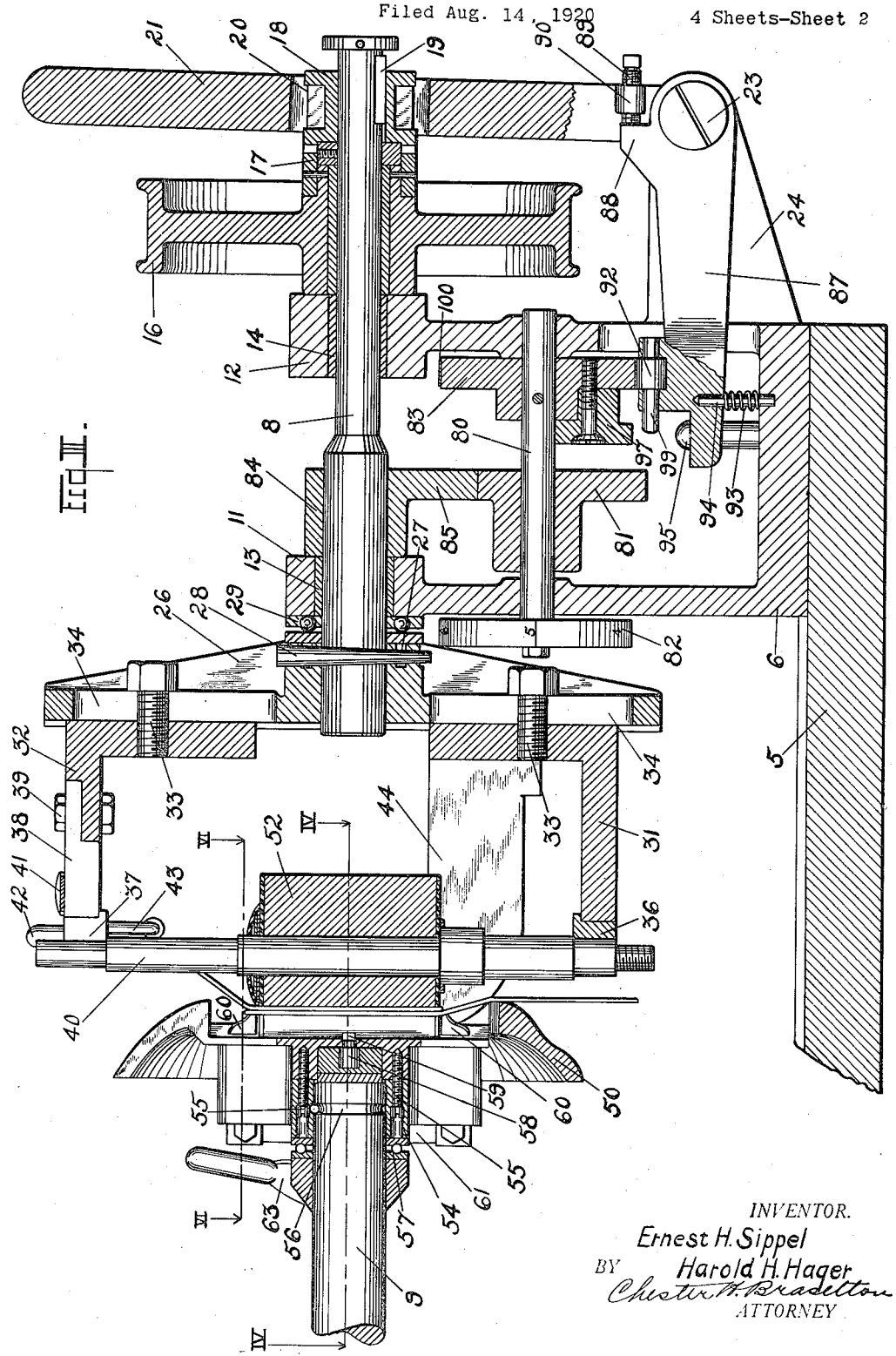

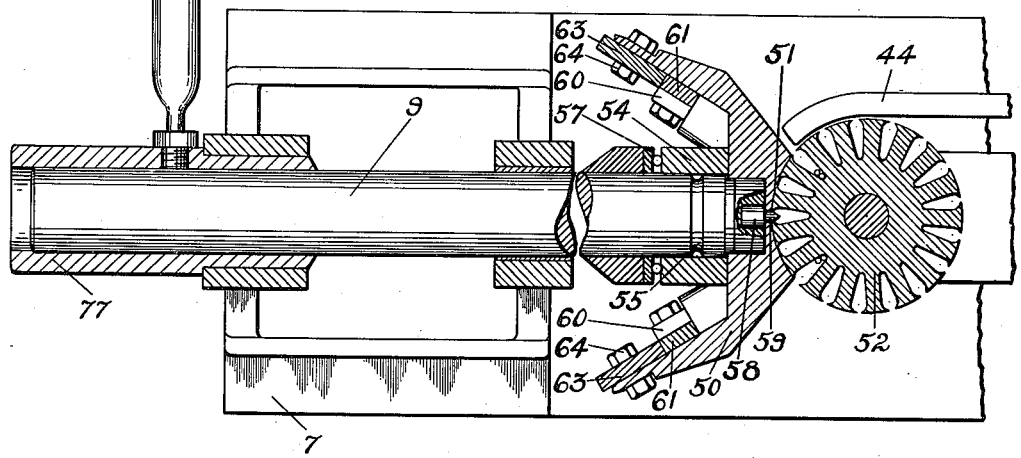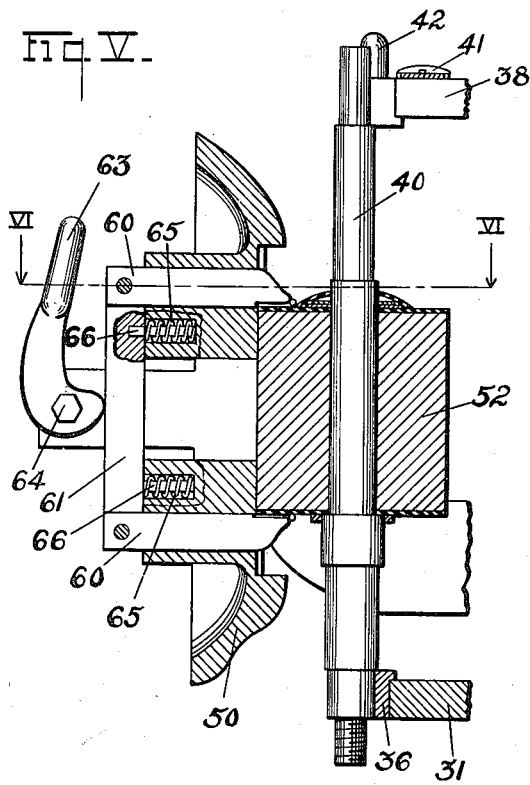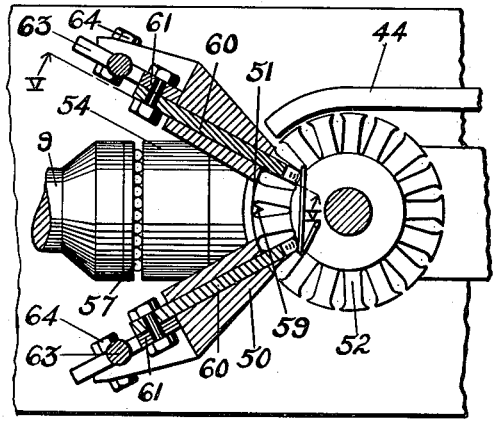

July 29, 1924.                    1,503,254
E. H. SIPPEL ET AL
ARMATURE WINDING MACHINE
Filed Aug. 14, 1920          4 Sheets-Sheet 4
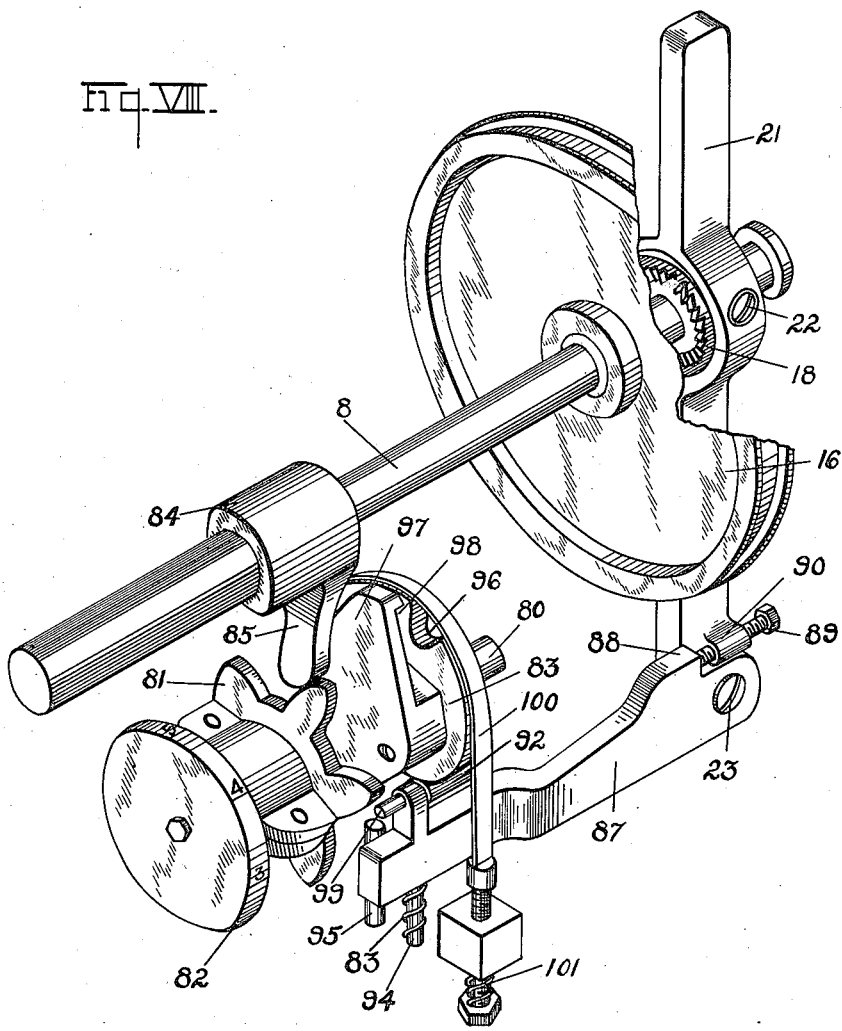
Fig. VIII.
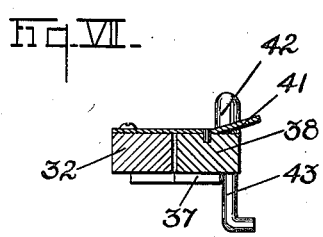
Fig. VII.
INVENTOR.
Ernest H. Sippel
Herold H. Hager
BY
Chester H. Braselton
ATTORNEY Patented July 29, 1924.

1,503,254

UNITED STATES PATENT OFFICE.

ERNEST H. SIPPEL AND HAROLD H. HAGER, OF TOLEDO, OHIO, ASSIGNORS, BY MESNE ASSIGNMENTS, TO THE ELECTRIC AUTO-LITE COMPANY, OF TOLEDO, OHIO, A CORPORATION OF OHIO.

ARMATURE-WINDING MACHINE.

Application filed August 14, 1920. Serial No. 403,605.

*To all whom it may concern:*

Be it known that we, ERNEST H. SIPPEL and HAROLD H. HAGER, citizens of the United States, residing at Toledo, county of Lucas, and State of Ohio, have invented certain new and useful Improvements in Armature-Winding Machines, of which we declare the following to be a full, clear, and exact description.

This invention relates to devices for winding the wire on armatures of dynamo-electric machines. Where the winding is of the two-pole type little difficulty is experienced in winding armatures by machines since the wire in that case passes substantially diametrically across the ends of the core and naturally seeks the bottom of the slots. In the case of windings of four, six or more poles much difficulty has been experienced in winding by machine due largely to the fact that with narrow mouthed slots the wire does not readily enter the slots and after entering has a tendency to remain near the mouth of the slot rather than to take its proper position toward the bottom of the slot It is an object of our invention to provide a machine for winding armatures of four or more poles which shall overcome the afore-mentioned difficulties.

Another object is to provide a machine of this nature in which the end turns of the winding shall be spaced from the ends of the cores, each conductor extending straight out a substantial distance from the end of the slot before turning to form the end turn.

Another object is to provide means to insure the correct positioning of the armature core relative to the means for guiding the wire in the slots.

Another object is to provide a winding machine which may be initially rotated by hand to start the winding and subsequently rotated by power means and when a predetermined number of turns have been wound to automatically stop.

Another object is to provide an armature winding machine which shall be easy, simple and convenient in operation, shall not injure the wire or insulation thereon, have few parts requiring manipulation by the operator and which shall facilitate the greatest rapidity of winding.

Further objects of this invention relate to economies of manufacture and details of construction as will hereinafter appear from the detailed description to follow. We accomplish the objects of our invention in one instance by the devices and means described in the following specification, but it is evident that the same may be varied widely without departing from the scope of the invention as pointed out in the appended claims. A structure constituting one embodiment of our invention, which may be the preferred, is illustrated in the accompanying drawings forming a part hereof, in which:

Figure I is a side elevation of a machine embodying our invention.

Fig. II is a top plan view of the machine shown in Fig. I.

Fig. III is a longitudinal vertical section taken in the line III—III of Fig. II.

Fig. IV is a horizontal sectional view of the guide portion of the machine including an armature core taken on lines IV—IV of Figs. I and III.

Fig. V is a detail sectional view taken on the line V—V of Fig. VI.

Fig. VI is a horizontal detail sectional view taken on lines VI—VI of Figs. III and V.

Fig. VII is a detail sectional view taken on the line VII—VII of Fig. II and

Fig. VIII is a perspective view showing the starting and stopping mechanism.

In the drawings, the same reference numerals refer to similar parts throughout the several views, and the sectional views are taken looking in the direction of the arrows at the ends of the section lines.

Referring to the drawings, a frame 5 having two bearing brackets 6 and 7 supports what may be termed a head shaft 8 and a tail shaft 9. The bearing bracket 6 has two bearings 11 and 12 having bearing sleeves 13 and 14, respectively, for the shaft 8. A driving pulley 16 is journalled to turn freely on the shaft 8 and the outer hub portion of this pulley has a ring 17 pinned to it having a toothed edge which is adapted to engage a correspondingly toothed sleeve member 18 keyed to the shaft 8 at 19. The member 18 is provided with an annular groove 20 in which engages a pair of bearing segments secured to the handle 21 by screws 22. The hand lever 21 is pivoted by screw 23 to a bracket 24 forming a part of the bearing bracket 6. By the operation of this handle the shaft 8 may be connected or disconnected from the driving pulley 16.

The opposite or forward end of the shaft 8 carries a head 26, the hub portion of which is provided with a plurality of notches 27 in order to effect an adjustable connection with the shaft 8 by means of the tapered pin 28. Between the head 26 and the bearing 11 is a thrust bearing 29. Two substantially L-shaped brackets 31 and 32 are adjustably carried by the head 26 by means of bolts 33 engaging in slots 34 in the head and these brackets carry respectively at their forward ends bearings 36 and 37. Bearing 36 is in the nature of a half bearing in order to permit the ready insertion and removal of one end of the armature shaft. The bearing 37, together with a portion of the L-shaped bracket 32, is divided longitudinally, one-half of the latter being integral therewith and the other half being formed by member 38 which is pivoted to bracket 32 at 39 such that the bearing may be opened and closed to permit the insertion and removal of an armature shaft 40. A latch 41 is provided to normally hold the two bearing portions together and a stud or handle 42 on the top of the member 38 facilitates moving the same. Extending from the under side of the member 38 is a wire hook 43 about which may be looped the end of the wire or wires constituting the armature winding.

Each L-shaped bracket carries a guide 44 which extends forwardly adjacent one end of an armature core and has its end curved to conform thereto and tapered, the particular shape being such that as the armature core is rotated these guides shall co-operate with the slots and with other guides, presently to be described, to cause the wire to be properly wound upon the core.

Considering now, the tail shaft 9 and parts carried thereby, it will be seen that this shaft serves to support and move into position a guide member or plate 50 which is adapted to co-operate with the armature and with the guides 44 to cause the wire or wires as they are wound upon the core to take their proper places in the slots. The guide plate 50 is substantially oval in contour and has its central or body portion curved as at 51, see Fig. IV, to fit the core to be wound and has its upper and lower extremities suitably curved to direct the wire in the afore-mentioned manner. A bearing sleeve 54 secured to the central portion of the member 50 by means of screws 55 is rotatably held on the end of the shaft 9 by a pin engaging in a groove 56 and behind the sleeve 54 is a thrust bearing 57. In order to insure the proper positioning of the core 52 rotatively with respect to the guide plate 50 the latter is provided at its central portion with a pin 58 having its projecting end formed with an edge 59 which, as the guide plate 50 is brought up to a core, is adapted to enter a slot and restrain the core from rotative movement while the guide plate is in operative position.

If no provision were made to prevent the wire as it is wound upon the core from bending short where it enters and leaves a slot there would be danger of the insulation surrounding the wire being cut through at that point and also the insulating material which is commonly used in the slots and which preferably is allowed to project slightly beyond the ends of the slots would be broken down at the projecting portion. It is, therefore, advisable to have the wire conductors extending out a short distance beyond each end of the armature core before bending to form the end turns. To accomplish this feature, the guide plate 50 is provided with two pairs of spacing fingers 60, the fingers of each pair being connected by a cross member 61 and being mounted to slide longitudinally and substantially radially of the armature core. The forward ends of these fingers are suitably tapered so that during the winding operation the end turns are formed over the tapered portions and when the winding is complete the fingers may be withdrawn without injury to the insulation of the wire. A cam lever 63 pivoted to the guide plate 50 at 64 serves to move the fingers to their forward positions and small coil springs 65 embedded in the guide plate 50 and surrounding pins 66 carried by the member 61 serve to withdraw the fingers 60 when the cam lever is thrown back.

Suitable wire tensioning devices, such for example as the spring pressed wheels 70, are provided to insure the necessary tension to the wire or wires being wound on the armature. In this connection it is to be noted that the drawing shows a pair of wires being wound on the armature but this, of course, is optional as one or a plurality of wires may, if desired, be wound at the same time and connected in parallel. On the end of the shaft 9, opposite to that carrying the guide lead, there is a handle 75 which engages in an L-shaped groove 75 in the bearing sleeve 77 and by means of this handle the shaft 9, together with the parts carried thereby, is moved toward and away from the core to be wound. In its extreme forward position the handle is given a rotative movement and thus locks the shaft and holds the plate 50 in its forward position against the core.

In order to insure that the winding of each pair of slots shall comprise a given number of turns only and to stop further rotation of the core when the winding is complete, the following mechanism is provided: A stub shaft 80 is journaled in the bearing brackets 11 and 12 and carries a spur wheel 81, a graduated wheel 82 and a cam 83. The spur wheel 81 has as many teeth as it is desired that the winding shall have turns and is engaged by a dog 84 on the shaft 8, having a single tooth 85. A lever 87 pivoted to the bracket 24 by means of a screw 23 has near its pivot end a lug 88 which is adapted to engage the end of a screw 89 carried by a lug 90 on the hand lever 21, and the opposite end of this lever carries a roller 92 which is held in engagement with the cam 83 by means of a spring 93 encircling a pin 94. To relieve the fulcrum end of the lever 87 of lateral strains, a stud 95 is provided, carried by the bracket member 6. Although the purpose of the spring 93 is to hold the roller 92 of the lever 87 in constant engagement with the cam wheel 83 and to cause it to enter the notch 96 therein, a further means is provided to make this operation positive. This means comprises a cam member 97 having an undercut portion 98 which is adapted to engage the pin 99 upon which the roller 92 is mounted and thereby force the roller into the notch 96 to operate the clutch release. A band brake 100 secured at opposite ends to the frame of the machine and having an adjustable connection therewith, as at 101, serves to restrain the rotative movement of the shaft 80. By means of the graduations of the wheel 82 the number of turns of the winding may be observed.

In the use of the device, assuming the shaft 9 and guide plate 50 to have been withdrawn from the head 26 and an armature core on its shaft to have been inserted in the bearings carried by the head and secured thereto by the latch device 41, the guide plate 50 is moved up and locked by the handle 75 and the lever 63 thrown up. The free end of the wire for the winding is then looped around the hook 43 and the head given a turn or fraction of a turn by hand to insure the proper starting of the wire, after which the hand lever 21 is moved forward to cause the clutch controlled thereby to engage and thus drive the shaft 8 and the armature core. At each revolution of the shaft 8 the stub shaft 80 is advanced one tooth and when it has made one complete revolution the roller 92 drops into the notch 96 of the cam. The lever 87 thereupon actuates the hand lever 21 to throw it into release position, whereupon further rotation of the armature ceases. The guide plate 50 may then be withdrawn and the armature rotated to bring the next pair of slots in position to receive their winding and so on until the entire winding is completed.

Inasmuch as the invention herein disclosed is susceptible of various other embodiments and as various changes might be made in the embodiment set forth, it is to be understood that all matter described above or shown in the accompanying drawings is to be interpreted as illustrative only, and not in a limiting sense.

Having thus described our invention, what we claim as new and desire to secure by Letters Patent, is:

1. In an armature winding machine, the combination of means for rotatably mounting a slotted armature core on an axis at right angles to the axis of the core, a shaft coaxial with said first axis, a guide plate carried thereby, means for moving said guide plate axially into contact with said core, wire spacing and rounding fingers mounted in said guide plate and means for moving said fingers relative thereto.

2. In an armature winding machine, the combination of a frame, a shaft journalled therein, an armature carrying head attached to one end of said shaft, a drive pulley for said shaft, a clutch between said pulley and the opposite end of said shaft, a hand lever for connecting said clutch, a second shaft geared to said first shaft, having a cam and a lever operatively connected to said hand lever and engaging said cam whereby said clutch is disengaged after a predetermined angular movement of said cam shaft.

In testimony whereof, we affix our signatures.

ERNEST H. SIPPEL.
HAROLD H. HAGER.